United States Patent
Habara et al.

(10) Patent No.: US 11,822,979 B2
(45) Date of Patent: Nov. 21, 2023

(54) COMPUTER SYSTEM AND DATA TRANSMISSION CONTROL METHOD

(71) Applicant: Hitachi, Ltd., Tokyo (JP)

(72) Inventors: Takuya Habara, Tokyo (JP);
Shinichiro Saito, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 44 days.

(21) Appl. No.: 17/690,347

(22) Filed: Mar. 9, 2022

(65) Prior Publication Data
US 2023/0071848 A1   Mar. 9, 2023

(30) Foreign Application Priority Data

Sep. 9, 2021   (JP) .................................. 2021-146630

(51) Int. Cl.
*G06F 9/54* (2006.01)

(52) U.S. Cl.
CPC .................................. *G06F 9/543* (2013.01)

(58) Field of Classification Search
None
See application file for complete search history.

(56) References Cited

U.S. PATENT DOCUMENTS

| | | | |
|---|---|---|---|
| 9,176,759 B1* | 11/2015 | Sahasranaman | G06F 9/45504 |
| 2009/0204795 A1* | 8/2009 | Nasuto | G06F 11/3414 |
| | | | 712/E9.016 |
| 2020/0225989 A1* | 7/2020 | Fawcett | G06F 9/505 |
| 2021/0232473 A1* | 7/2021 | Laskawiec | G06F 11/3419 |

FOREIGN PATENT DOCUMENTS

| | | |
|---|---|---|
| JP | 2008-40718 A | 2/2008 |
| JP | 2020-91706 A | 6/2020 |

* cited by examiner

*Primary Examiner* — Syed A Roni
(74) *Attorney, Agent, or Firm* — Crowell & Moring LLP

(57) ABSTRACT

A computer system is configured to: obtain, from each of a plurality of processing applications, a communication index for evaluating data transmission and reception performance of the each of the plurality of processing applications, the plurality of processing applications each being configured to: obtain data from a source object; execute predetermined processing on the data; and transmit a result of the processing to a destination object; calculate a link allowable value indicating processing performance of each of the plurality of processing applications based on the communication index; generate a transmission plan relating to an amount of data to be allocated to each of the plurality of processing applications based on the link allowable value; and control transmission of the data to each of the plurality of processing applications based on the transmission plan.

10 Claims, 13 Drawing Sheets

| T101 | T102 | T103 | T104 | T105 | 152 |
|---|---|---|---|---|---|
| TRANSMISSION APPLICATION | PROCESSING APPLICATION | RECEPTION APPLICATION | DATA TRANSFER AMOUNT(1) | DATA TRANSFER AMOUNT(2) | |
| | | | | | |

| T201 | T202 | T203 | 153 |
|---|---|---|---|
| TRANSMISSION APPLICATION | PROCESSING APPLICATION | LINK ALLOWABLE VALUE | |
| | | | |

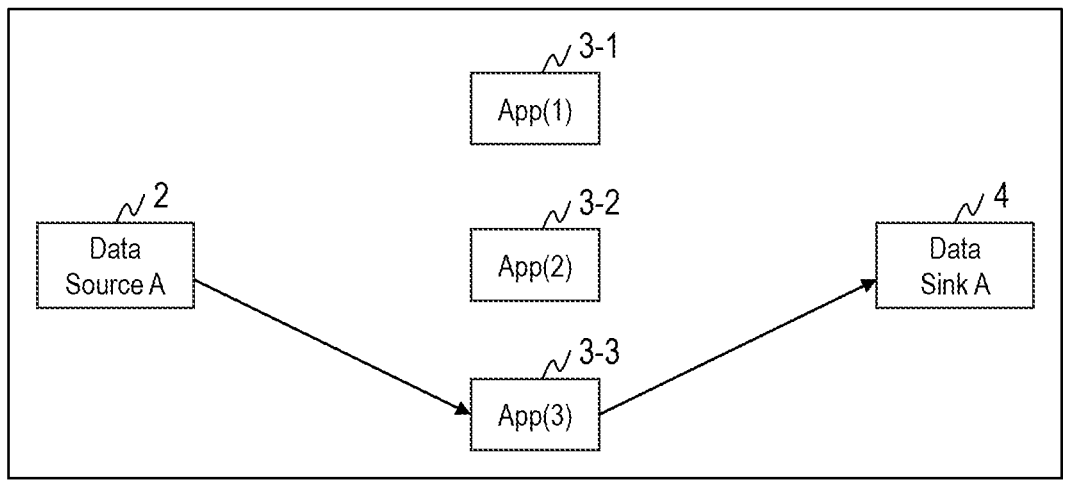

FIG. 12C

| T101 | T102 | T103 | T104 | T105 |
|---|---|---|---|---|
| TRANSMISSION APPLICATION | PROCESSING APPLICATION | RECEPTION APPLICATION | DATA TRANSFER AMOUNT(1) | DATA TRANSFER AMOUNT(2) |
| Data Source A | App(1) | Data Sink A | 8 topic/sec | 8 topic/sec |
| Data Source A | App(1) | Data Sink A | 9 topic/sec | 8 topic/sec |
| Data Source A | App(1) | Data Sink A | 10 topic/sec | 10 topic/sec |
| Data Source A | App(1) | Data Sink A | 11 topic/sec | 10 topic/sec |

FIG. 13A

| T101 | T102 | T103 | T104 | T105 |
|---|---|---|---|---|
| TRANSMISSION APPLICATION | PROCESSING APPLICATION | RECEPTION APPLICATION | DATA TRANSFER AMOUNT(1) | DATA TRANSFER AMOUNT(2) |
| ⋮ | ⋮ | ⋮ | ⋮ | ⋮ |
| Data Source A | App(2) | Data Sink A | 18 topic/sec | 18 topic/sec |
| Data Source A | App(2) | Data Sink A | 19 topic/sec | 19 topic/sec |
| Data Source A | App(2) | Data Sink A | 20 topic/sec | 20 topic/sec |
| Data Source A | App(2) | Data Sink A | 21 topic/sec | 20 topic/sec |

FIG. 13B

| TRANSMISSION APPLICATION | PROCESSING APPLICATION | RECEPTION APPLICATION | DATA TRANSFER AMOUNT(1) | DATA TRANSFER AMOUNT(2) |
|---|---|---|---|---|
| ⋮ | ⋮ | ⋮ | ⋮ | ⋮ |
| Data Source A | App(3) | Data Sink A | 9 topic/sec | 9 topic/sec |
| Data Source A | App(3) | Data Sink A | 10 topic/sec | 10 topic/sec |
| Data Source A | App(3) | Data Sink A | 11 topic/sec | 11 topic/sec |
| Data Source A | App(3) | Data Sink A | 12 topic/sec | 11 topic/sec |

FIG. 13C

| TRANSMISSION APPLICATION | PROCESSING APPLICATION | LINK ALLOWABLE VALUE |
|---|---|---|
| Data Source A | App(1) | 10 topic/sec |
| Data Source A | App(2) | 20 topic/sec |
| Data Source A | App(3) | 11 topic/sec |

FIG. 14

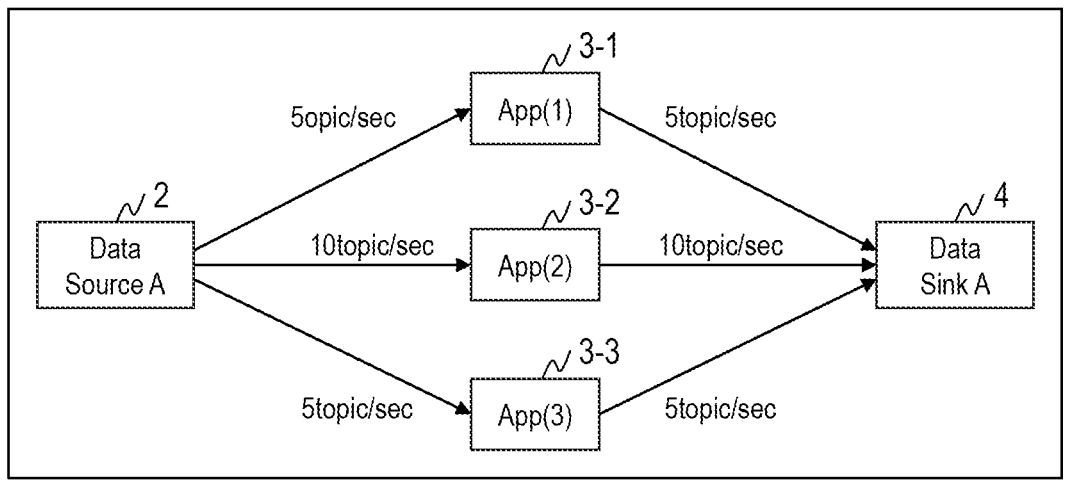

FIG. 15A

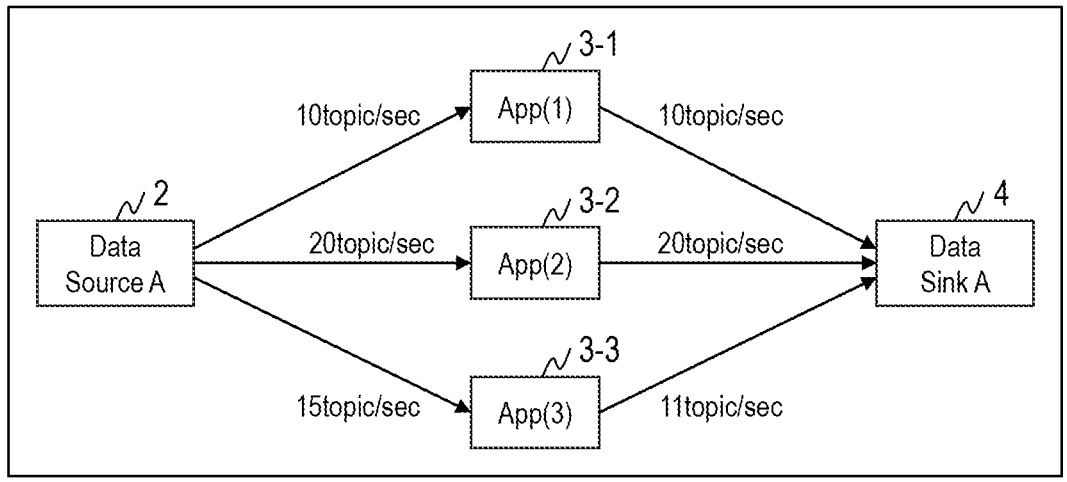

FIG. 15B

| T101 | T102 | T103 | T111 | T112 152 |
|---|---|---|---|---|
| TRANSMISSION APPLICATION | PROCESSING APPLICATION | RECEPTION APPLICATION | DATA TRANSFER AMOUNT | TRANSFER TIME |
|  |  |  |  |  |

FIG. 16

| T101 | T102 | T103 | T111 | T112 152 |
|---|---|---|---|---|
| TRANSMISSION APPLICATION | PROCESSING APPLICATION | RECEPTION APPLICATION | DATA TRANSFER AMOUNT | TRANSFER TIME |
| Data Source A | App(1) | Data Sink A | 5 topic/sec | 0.92 sec |
| Data Source A | App(1) | Data Sink A | 10 topic/sec | 0.92 sec |
| Data Source A | App(1) | Data Sink A | 15 topic/sec | 0.93 sec |
| Data Source A | App(1) | Data Sink A | 20 topic/sec | 2.35 sec |

FIG. 17A

| TRANSMISSION APPLICATION (T101) | PROCESSING APPLICATION (T102) | RECEPTION APPLICATION (T103) | DATA TRANSFER AMOUNT (T111) | TRANSFER TIME (T112) |
|---|---|---|---|---|
| ⋮ | ⋮ | ⋮ | ⋮ | ⋮ |
| Data Source A | App(2) | Data Sink A | 5 topic/sec | 0.62 sec |
| Data Source A | App(2) | Data Sink A | 10 topic/sec | 0.61 sec |
| Data Source A | App(2) | Data Sink A | 15 topic/sec | 0.67 sec |
| Data Source A | App(2) | Data Sink A | 20 topic/sec | 1.59 sec |

FIG. 17B

| TRANSMISSION APPLICATION (T101) | PROCESSING APPLICATION (T102) | RECEPTION APPLICATION (T103) | DATA TRANSFER AMOUNT (T111) | TRANSFER TIME (T112) |
|---|---|---|---|---|
| ⋮ | ⋮ | ⋮ | ⋮ | ⋮ |
| Data Source A | App(2) | Data Sink A | 5 topic/sec | 1.00 sec |
| Data Source A | App(2) | Data Sink A | 10 topic/sec | 1.01 sec |
| Data Source A | App(2) | Data Sink A | 15 topic/sec | 1.01 sec |
| Data Source A | App(2) | Data Sink A | 20 topic/sec | 1.83 sec |

FIG. 17C

| TRANSMISSION APPLICATION (T201) | PROCESSING APPLICATION (T202) | LINK ALLOWABLE VALUE (T203) |
|---|---|---|
| Data Source A | App(1) | 0.93 sec |
| Data Source A | App(2) | 0.67 sec |
| Data Source A | App(3) | 1.01 sec |

FIG. 18

COMPUTER SYSTEM AND DATA TRANSMISSION CONTROL METHOD

CLAIM OF PRIORITY

The present application claims priority from Japanese patent application JP 2021-146630 filed on Sep. 9, 2021, the content of which is hereby incorporated by reference into this application.

BACKGROUND OF THE INVENTION

This invention relates to a load distribution technology for a multiplexed data flow type application.

As a method of utilizing Internet of Things (IoT), there is a form of distributed computing in which data processing is performed in various parts ranging from a machine on a cloud service to a device placed at an edge such as a factory site. In recent years, there have been increasing moves toward microservices in which monolithic applications are subdivided and packaged depending on data processing functions. The packaging eliminates restrictions on hardware and operating systems (OSes), and hence it is possible to operate the subdivided applications in various environments. In the following description, a subdivided application is also referred to simply as "application."

The application is not always operated on a cloud service having abundant computing resources, and may be operated on a device having scarce computing resources which is present at the edge. When the application is operated on a device having scarce computing resources, an amount of data that can be processed per unit time of the application decreases. In view of this, there is a technology called scale-out. In the scale-out, replicas of the application are generated, and a plurality of applications are caused to execute processing in parallel. In a case of a system that employs a microservice architecture, it suffices that replicas are created for only the application having a high execution load and a lowered amount of data that can be processed per unit time. It is possible to improve, by causing the plurality of applications including the replica to execute processing in parallel, throughput of the data processing in the entire system as compared to a case of operating a single application.

The applications and the replicas thereof can be arranged not only in devices on the cloud service and the edge, but also in a device located in a communication layer, such as a multi-access edge computing server. It is also possible to easily change a band and a route of communication by enabling the communication to be controlled in a software manner.

Under such a situation in which options for arranging applications are diverse, a communication environment of the applications changes from moment to moment. In order to improve the throughput of data processing of all the applications that form a microservice, it is required to follow changes in the environment in which the respective applications are arranged.

It is an idea to devise a method of selecting applications that are multiplexed and arranged in a distributed manner in order to follow the changes in the environment. In a system in which multiplexed applications are arranged in a distributed manner, it is required to select an application for executing processing. A result of data processing does not change irrespective of which application is used, but the throughput of the data processing differs depending on the computing resources and the communication environment.

In addition, unlike an application in which a distinction between a server and a client is clear, a data flow type application is required to be selected in consideration of the computing resources and the communication environment in both storage and retrieval of data while being aware of coupling of data flows.

Technologies as described in JP 2020-91706 A and JP 2008-40718 A are known as technologies for selecting an application for performing data processing from among applications arranged in a distributed manner.

JP 2020-91706 A includes the description of "Provided is a storage management apparatus capable of communicating to/from a plurality of edge servers each including a storage module configured to store data and access log information for the data, the storage management apparatus being configured to: acquire the access log information from each edge server; determine based on the acquired access log information whether or not a status of access to the data stored in the data storage module of each edge server satisfies a criterion set in advance; select, as a transfer target, the data for which it has been determined that the status of access does not satisfy the above-mentioned criterion; and control the data to be transferred to the storage module different from the storage module in which the data has been stored."

JP 2008-40718 A includes the description that "When there are a plurality of candidates for a transfer destination server to which a received request is to be transferred, the request is transmitted to a server there among for which the number of requests waiting for a response has not reached a threshold value. When all the candidates for the transfer destination server have reached the threshold value of the number of requests waiting for a response, the request is stored in a buffer, and the transfer is waited until the number of requests waiting for a response falls below the threshold value in any one of the servers. It is also determined whether or not the request can be transferred to each individual server in units of requests or responses with fine granularity. In addition, when there are a plurality of servers for which the number of requests waiting for a response has not reached the threshold value, the server is selected based on the number of requests waiting for a response for each server."

SUMMARY OF THE INVENTION

The technology as described in JP 2020-91706 A can achieve improvement in efficiency of data retrieval and effective storage utilization. However, in the case of the data flow type application, it is assumed that the stored data is evenly retrieved, and a frequency of use does not increase. Therefore, the technology as described in JP 2020-91706 A is not effective. The technology as described in JP 2008-40718 A can prevent data overflow at a time of storing data. However, a load at a time of outputting data is not taken into consideration, and hence this technology is not always effective for a system in which applications are arranged in a distributed manner.

This invention has an object to provide a technology for achieving data allocation to a multiplexed data flow type application, which improves performance of data processing.

A representative example of the present invention disclosed in this specification is as follows: a computer system comprises at least one computer including a processor, a storage device coupled to the processor, and a network interface coupled to the processor. The processor is configured to obtain, from each of a plurality of processing applications, a communication index for evaluating data transmission and reception performance of the each of the plurality of processing applications. The plurality of processing applications each is configured to: obtain data from a source object; execute predetermined processing on the data; and transmit a result of the processing to a destination object. The processor is configured to: calculate a link allowable value indicating processing performance of each of the plurality of processing applications based on the communication index; generate a transmission plan relating to an amount of data to be allocated to each of the plurality of processing applications based on the link allowable value; and control transmission of the data to each of the plurality of processing applications based on the transmission plan.

According to the at least one embodiment of this invention, it is possible to achieve the data allocation to the multiplexed data flow type application, which improves throughput of data processing in the entire system. Other problems, configurations, and effects than those described above will become apparent in the descriptions of embodiments below.

BRIEF DESCRIPTION OF THE DRAWINGS

The present invention can be appreciated by the description which follows in conjunction with the following figures, wherein:

FIG. 12A, FIG. 12B, and FIG. 12C are explanatory diagrams of a method of measuring communication indices of the control system in the first embodiment;

FIG. 13A, FIG. 13B, and FIG. 13C are tables for showing specific examples of the measurement result information in the first embodiment;

FIG. 14 is a table for showing a specific example of the link allowable value information in the first embodiment;

FIG. 15A and FIG. 15B are diagrams for illustrating an example of a communication state of the applications to be controlled in the first embodiment;

FIG. 16 is a table for showing an example of the data structure of the measurement result information in a second embodiment;

FIG. 17A, FIG. 17B, and FIG. 17C are tables for showing specific examples of the measurement result information in the second embodiment;

FIG. 18 is a table for showing a specific example of the link allowable value information in the second embodiment;

DETAILED DESCRIPTION OF THE PREFERRED EMBODIMENTS

Figure 1:
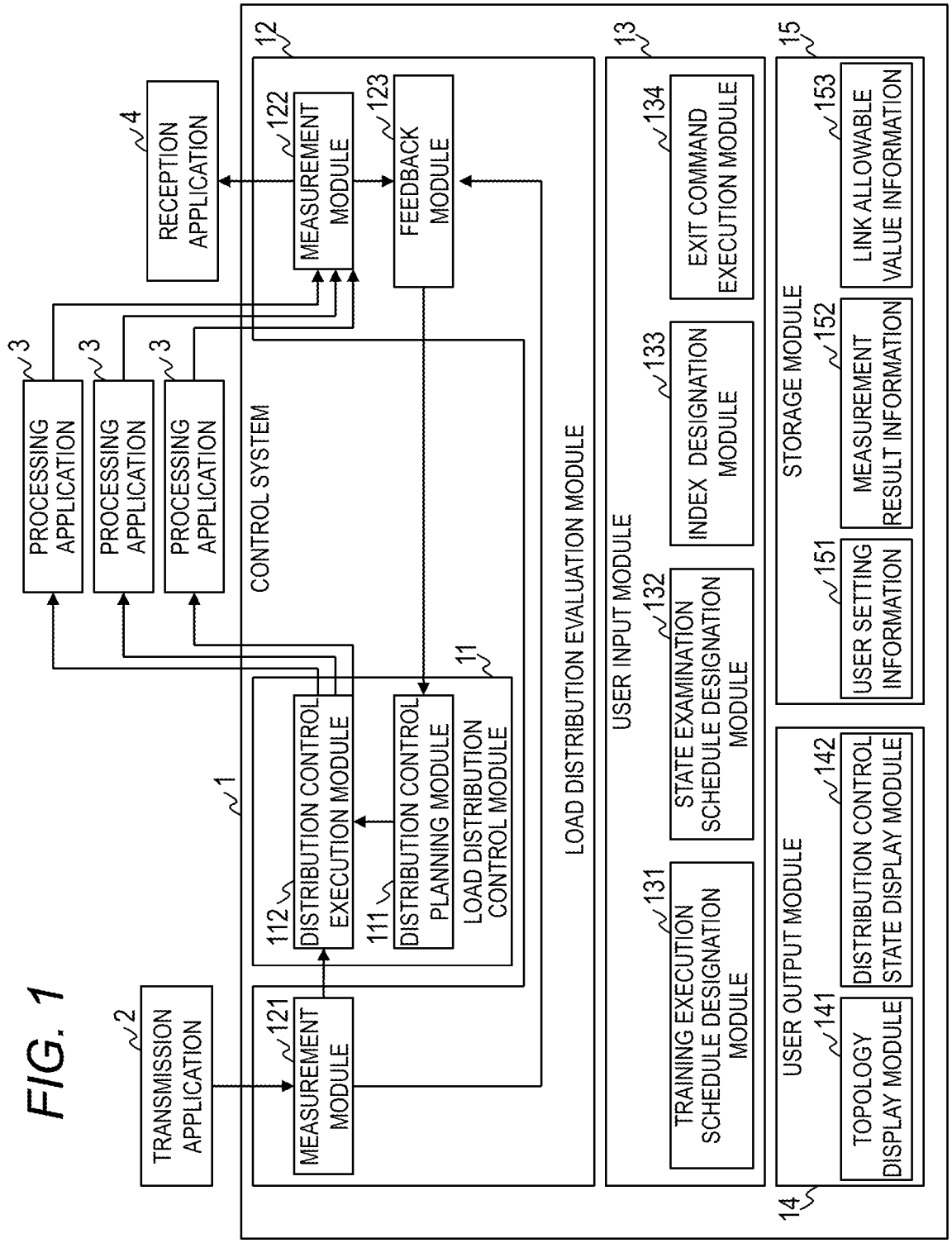
FIG. 1 is a diagram for illustrating a configuration example of a system according to a first embodiment of this invention.

Now, a description is given of an embodiment of this invention referring to the drawings. It should be noted that this invention is not to be construed by limiting the invention to the content described in the following embodiment. A person skilled in the art would easily recognize that a specific configuration described in the following embodiment may be changed within the scope of the concept and the gist of this invention.

In a configuration of this invention described below, the same or similar components or functions are assigned with the same reference numerals, and a redundant description thereof is omitted here.

The position, size, shape, range, and others of each component illustrated in, for example, the drawings may not represent the actual position, size, shape, range, and other metrics in order to facilitate understanding of this invention. Thus, this invention is not limited to the position, size, shape, range, and others described in, for example, the drawings.

First Embodiment

Figure 2:
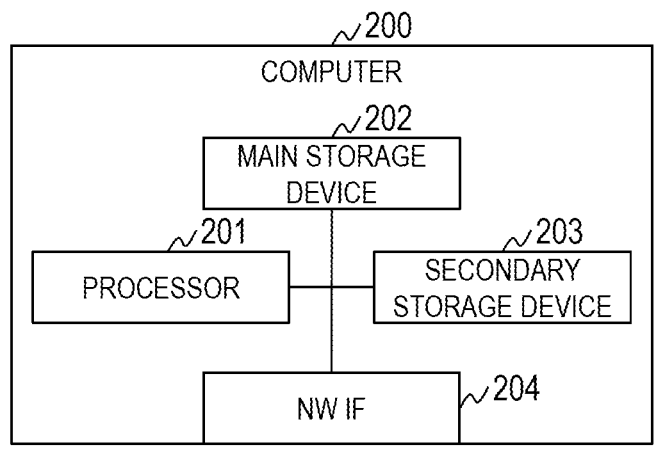
FIG. 2 is a diagram for illustrating an example of a computer included in a control system in the first embodiment.

FIG. 1 is a diagram for illustrating a configuration example of a system according to a first embodiment of this invention. FIG. 2 is a diagram for illustrating an example of a computer included in a control system in the first embodiment.

The system is formed of a control system 1, a transmission application 2, a processing application 3, and a reception application 4. There is a possibility that the transmission application 2, the processing application 3, and the reception application 4 may have a plurality of roles among those of the transmission application 2, the processing application 3, and the reception application 4 depending on how data of the system is used. For example, the transmission application 2 may function as the reception application 4.

The transmission application 2, the processing application 3, and the reception application 4 are herein referred to as "application" unless distinguished from each other. In addition, a set of the transmission application 2, the processing application 3, and the reception application 4 on a route through which the data flows is referred to as "link."

The control system 1 is formed of a computer 200 like that illustrated in FIG. 2. The control system 1 may include a storage system, a network switch, and the like.

The computer 200 includes a processor 201, a main storage device 202, a secondary storage device 203, and a network interface 204. The computer 200 may also include an input apparatus and an output apparatus.

The processor 201 executes programs stored in the main storage device 202. The processor 201 operates as a function unit (module) which implements a specific function by executing processing in accordance with the programs. In the following description, when processing is described with the function unit as the subject of the sentence, this indicates that the processor 201 executes a program for implementing the function unit. The main storage device 202 is a memory, for example, and stores the programs executed by the processor 201 and the data used by the programs. The secondary storage device 203 is, for example, a hard disk drive (HDD) or a solid state drive (SSD), and stores data permanently. The programs and data stored in the main storage device 202 may be stored in the secondary storage device 203. In this case, the processor 201 reads out programs and data from the secondary storage device 203, and loads the read programs and data onto the main storage device 202. The network interface 204 communicates to and from other apparatus via the network.

The control system 1 includes, as functional components, a load distribution control module 11, a load distribution evaluation module 12, a user input module 13, a user output module 14, and a storage module 15.

The load distribution control module 11 includes a distribution control planning module 111 and a distribution control execution module 112. The distribution control planning module 111 generates a transmission plan for controlling data received from the transmission application 2 to be transmitted to the processing application 3. The distribution control execution module 112 transmits the data received from the transmission application 2 to the processing application 3 based on the transmission plan generated by the distribution control planning module 111.

The load distribution evaluation module 12 includes measurement modules 121 and 122 and a feedback module 123. The measurement module 121 obtains an index (communication index) relating to communication between the transmission application 2 and the processing application 3, and the measurement module 122 obtains an index (communication index) relating to communication between the processing application 3 and the reception application 4. Conceivable examples of the communication index include a number of transferred messages per unit time, a transferred data size per unit time, a transfer time, a round trip time, and a hop count. However, the communication index is not limited thereto. The measurement modules 121 and 122 also obtain a number of replicas of an application and a coupling state of applications with respect to each other.

The user input module 13 includes a training execution schedule designation module 131, a state examination schedule designation module 132, an index designation module 133, and an exit command execution module 134. The training execution schedule designation module 131 receives input of a schedule of a training for generating a transmission plan. The state examination schedule designation module 132 receives input of a schedule of a state examination. In this case, the state examination means examination of whether or not the transmission plan generated by the distribution control planning module 111 is appropriate, that is, whether or not a stable state S3 illustrated in FIG. 5 can be continued. The index designation module 133 receives input of the communication index to be used for generating the transmission plan. The exit command execution module 134 receives an instruction to stop the control system 1, and executes a command to stop the control system 1.

The user output module 14 includes a topology display module 141 and a distribution control state display module 142. The topology display module 141 displays a topology indicating an association between applications to a user. The distribution control state display module 142 displays operating statuses of the distribution control planning module 111 and the distribution control execution module 112 to the user.

The storage module 15 manages user setting information 151, measurement result information 152, and link allowable value information 153. The user setting information 151 stores a setting value input by the user input module 13. The measurement result information 152 stores the communication index measured by the measurement module 121. The link allowable value information 153 stores an allowable value of the communication index designated through intermediation of the index designation module 133.

Figure 3:
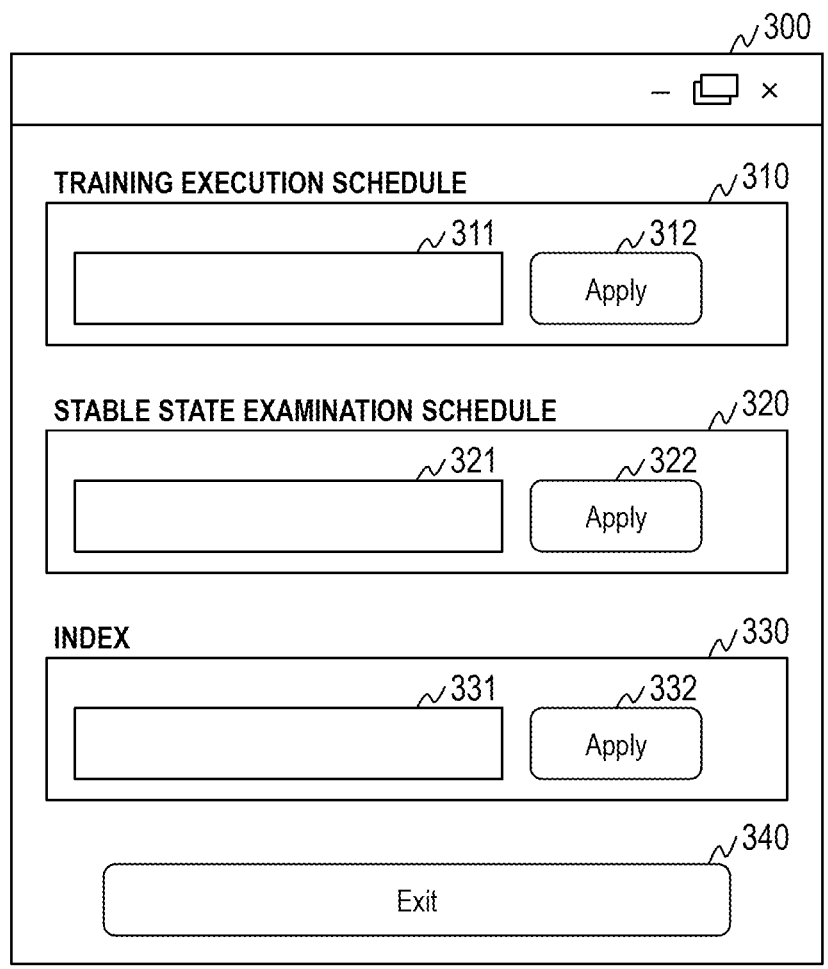
FIG. 3 is a diagram for illustrating an example of an interface presented by a user input module in the first embodiment.

FIG. 3 is a diagram for illustrating an example of an interface presented by the user input module 13 in the first embodiment.

The user input module 13 presents such an input screen 300 as illustrated in FIG. 3. The input screen 300 includes an operation field 310, an operation field 320, an operation field 330, and a exit button 340.

The operation field 320 includes an input field 321 and an apply button 322. The input field 321 is a field for inputting a schedule of a state examination to the state examination schedule designation module 132. When the user presses the apply button 322, the schedule input in the input field 321 is transmitted to the distribution control execution module 112 through intermediation of the state examination schedule designation module 132. The distribution control execution module 112 performs the state examination in accordance with the schedule as described later.

The operation field 320 includes an input field 321 and an apply button 312. The input field 321 is a field for inputting a schedule of a state examination to the state examination schedule designation module 132. When the user presses the apply button 322, the schedule input in the input field 321 is transmitted to the distribution control execution module 112 through intermediation of the state examination schedule designation module 132. The distribution control execution module 112 performs the state examination in accordance with the schedule as described later.

The operation field 330 includes an input field 331 and an apply button 332. The input field 331 is a field for inputting a communication index to be used by the distribution control planning module 111, that is, a type of the communication index for evaluating data transmission and reception performance of the processing application 3. When the user presses the apply button 332, the type of the communication index input in the input field 331 is transmitted to the distribution control planning module 111 through intermediation of the index designation module 133.

In the first embodiment, an amount (data transfer amount) of data received from the transmission application 2 by the processing application 3 and an amount (data transfer amount) of data transmitted to the reception application 4 by the processing application 3 are used as the communication index for evaluating the data transmission and reception performance of the processing application 3.

The exit button 340 is a button for instructing to stop the control system 1, and when the user presses the exit button 340, the exit command execution module 134 stops the control system 1.

Figure 4:
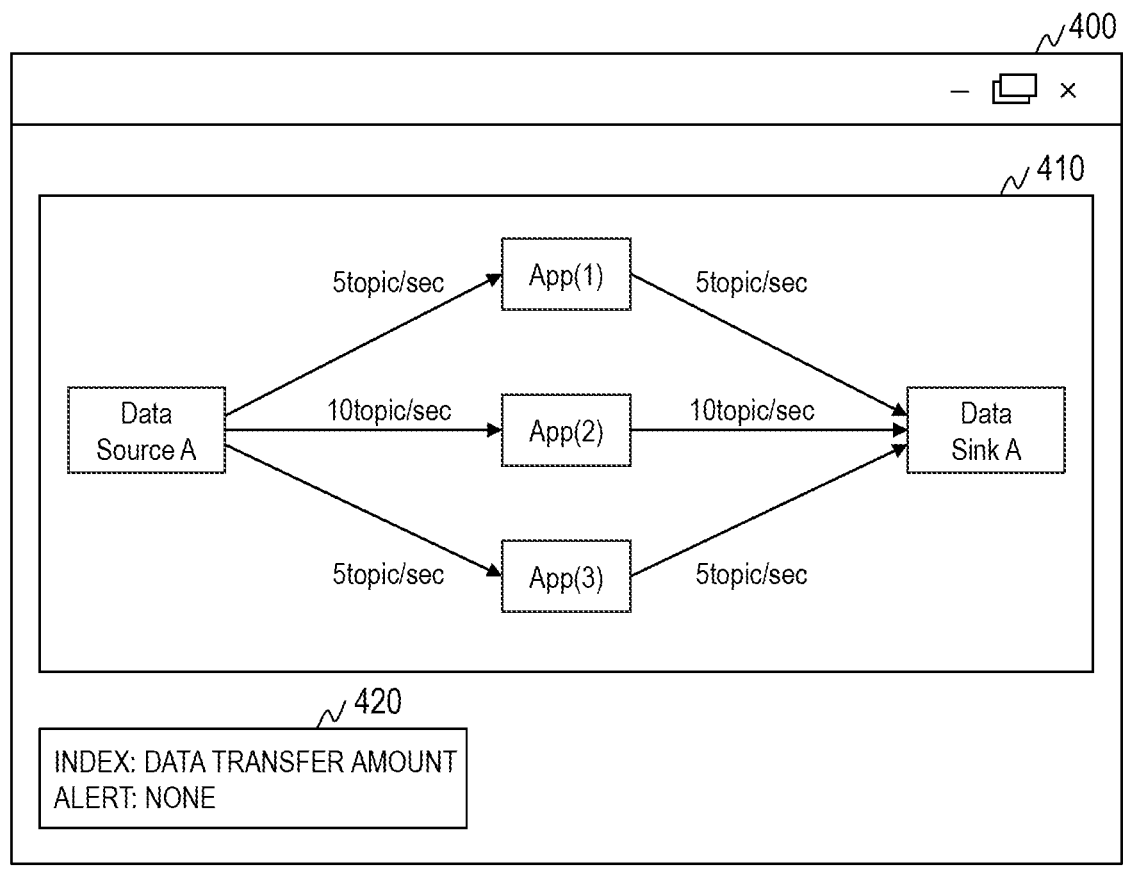
FIG. 4 is a diagram for illustrating an example of an interface presented by a user output module in the first embodiment.

FIG. 4 is a diagram for illustrating an example of an interface presented by the user output module 14 in the first embodiment.

The user output module 14 presents such an output screen 400 as illustrated in FIG. 4. The output screen 400 includes a display field 410 and a display field 420.

The display field 410 is a field for displaying information generated by the topology display module 141. The topology display module 141 displays, in the display field 410, the association between the applications managed by the control system 1 and the communication indices measured by the measurement module 121.

The display field 420 is a field for displaying information generated by the distribution control state display module 142. The distribution control state display module 142 displays, in the display field 420, the type of the communication index designated through intermediation of the index designation module 133, an execution log of the distribution control execution module 112, an instruction for the user, and other such information.

Figures 5, 6, 7:
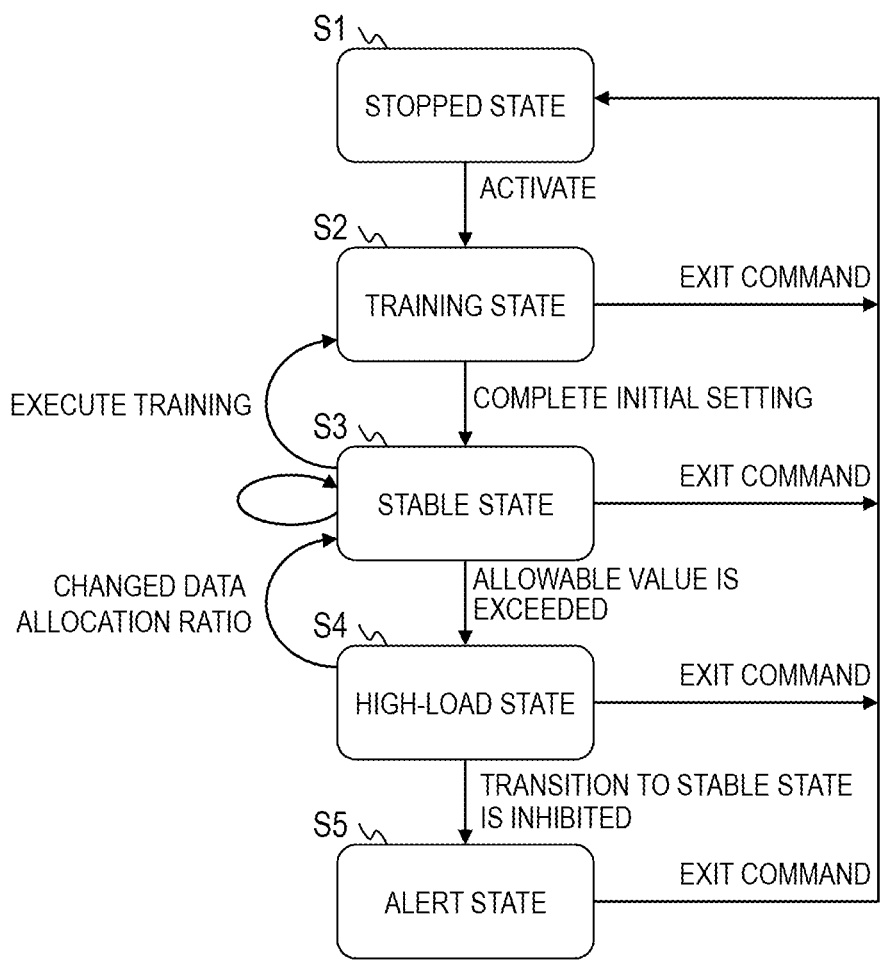
FIG. 5 is a diagram for illustrating transitions of an operating state of the control system in the first embodiment.
FIG. 6 is a table for showing an example of data structure of measurement result information in the first embodiment.
FIG. 7 is a table for showing an example of data structure of link allowable value information in the first embodiment.

FIG. 5 is a diagram for illustrating transitions of an operating state of the control system 1 in the first embodiment.

An initial state of the control system 1 is a stopped state S1. In a case where the control system 1 is activated, the control system 1 transitions to a training state S2.

In the training state S2, the control system 1 executes training processing. In a case where the training processing is completed, the control system 1 transitions to the stable state S3.

In the stable state S3, the control system 1 periodically examines execution triggers for a state examination and a training.

In a case where the execution triggers for the state examination and the training have not been detected, the control system 1 maintains the stable state S3. In a case where the execution trigger for the training has been detected, the control system 1 transitions to the training state S2. In a case where the execution trigger for the state examination has been detected, the control system 1 determines whether or not the transmission plan is appropriate. In a case where, as a result of the determination, it is not required to change the transmission plan, the control system 1 maintains the stable state S3. In a case where, as a result of the determination, it is required to change the transmission plan, the control system 1 transitions to a high-load state S4.

In the high-load state S4, the control system 1 changes the transmission plan. In a case where the change of the transmission plan has been successful, the control system 1 transitions to the stable state S3. In a case where the change of the transmission plan has not been successful, the control system 1 transitions to an alert state S5.

In the alert state S5, the control system 1 presents the fact that distribution control satisfying conditions is impossible to the user through intermediation of the distribution control state display module 142.

Even under the alert state S5, the control system 1 may execute the transmission and reception of the data in accordance with the transmission plan. However, there is a possibility that the data processing may be stagnated, and hence the user is required to, for example, increase the number of replicas or reduce the amount of data to be transmitted from the transmission application 2.

In a case where the exit button 340 is pressed under the training state S2, the stable state S3, the high-load state S4, and the alert state S5, the exit command execution module 134 executes an exit command, and the control system 1 transitions to the stopped state S1.

FIG. 6 is a table for showing an example of data structure of the measurement result information 152 in the first embodiment.

The measurement result information 152 is information having a table format, and stores an entry including a transmission application T101, a processing application T102, a reception application T103, a data transfer amount (1) T104, and a data transfer amount (2) T105. There is one entry of a measurement result for one link. The fields included in the entry are not limited to those described above.

The transmission application T101 is a field for storing identification information on the transmission application 2. The processing application T102 is a field for storing identification information on the processing application 3. The reception application T103 is a field for storing identification information on the reception application 4. The data transfer amount (1) T104 is a field for storing the data transfer amount between the transmission application 2 and the processing application 3. The data transfer amount (2) T105 is a field for storing the data transfer amount between the processing application 3 and the reception application 4.

The measurement result information 152 is not limited to the table format, and may have, for example, a comma-separated-value (CSV format or an extensible-markup-language (XML) format.

FIG. 7 is a table for showing an example of data structure of the link allowable value information 153 in the first embodiment.

The link allowable value information 153 is information having a table format, and stores an entry including a transmission application T201, a processing application T202, and a link allowable value T203. There is one entry for one link. The fields included in the entry are not limited to those described above.

The transmission application T201 is a field for storing the identification information on the transmission application 2. The processing application T202 is a field for storing the identification information on the processing application 3. The link allowable value T203 is a field for storing an allowable value (maximum value) of the data transfer amount in the link. In the first embodiment, the maximum value of the data transfer amount between the transmission application 2 and the processing application 3 is stored.

The link allowable value information 153 is not limited to the table format, and may have, for example, a CSV format or an XML format.

Figure 8:
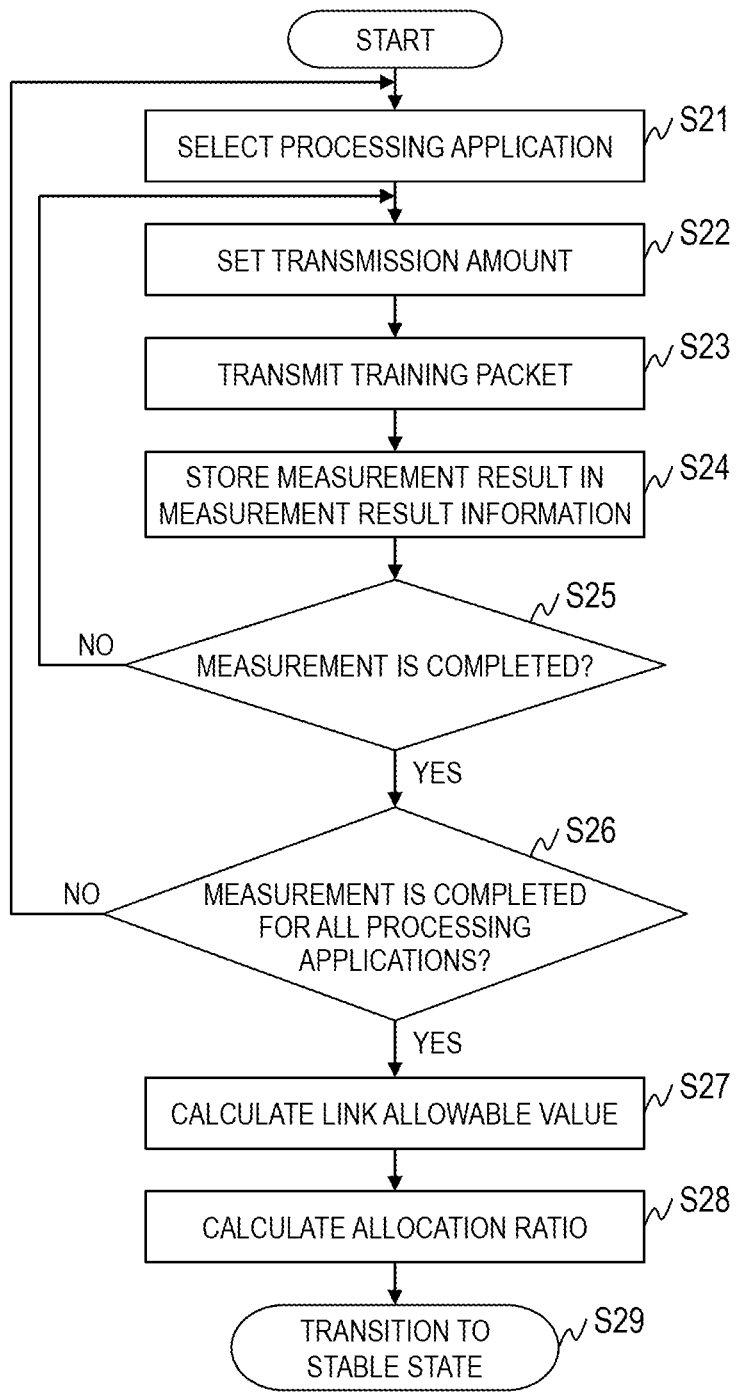
FIG. 8 is a flowchart for illustrating processing to be executed by the control system in the first embodiment under a training state S2.

FIG. 8 is a flowchart for illustrating processing to be executed by the control system 1 in the first embodiment under the training state S2.

The distribution control execution module 112 of the control system 1 selects one processing application 3 from among the processing applications 3 to be monitored (Step S21).

The distribution control execution module 112 sets a data transmission amount (Step S22). In a case where the data transmission amount is set for the first time, the distribution control execution module 112 sets an initial value, and in a case where the data transmission amount has already been set, the distribution control execution module 112 adds an increase amount to a current value. It is assumed that the initial value and the increase amount are set in advance. The initial value and the increase amount may be enabled to be updated.

The distribution control execution module 112 instructs the transmission application 2 to transmit a training packet having the set amount of data, and transmits the received training packet to the selected processing application 3 (Step S23). The training packet reaches the reception application 4 through intermediation of the processing application 3.

The measurement modules 121 and 122 of the load distribution evaluation module 12 each measure a value of the communication index designated through intermediation of the index designation module 133 during a period for transmitting the training packet, and output measurement results to the distribution control planning module 111 through intermediation of the feedback module 123. The distribution control planning module 111 stores the measurement results in the measurement result information 152 (Step S24). The distribution control planning module 111 can identify each application based on, for example, an IP address included in the training packet.

The distribution control execution module 112 determines whether or not to complete the measurement after completion of the measurement performed by the measurement modules 121 and 122 (Step S25).

For example, in a case where the data transfer amount between the processing application 3 and the reception application 4 is smaller than the data transfer amount between the transmission application 2 and the processing application 3, the distribution control execution module 112 completes the measurement.

In a case where the measurement is not to be completed, the distribution control execution module 112 returns the process to Step S22 to execute the same processing.

In a case where the measurement is to be completed, the distribution control execution module 112 determines whether or not the measurement is completed for all the processing applications 3 (Step S26).

In a case where the measurement is not completed for all the processing applications 3, the distribution control execution module 112 returns the process to Step S21 to execute the same processing.

In a case where the measurement is completed for all the processing applications 3, the distribution control execution module 112 instructs the distribution control planning module 111 to generate a transmission plan. The distribution control planning module 111 calculates a link allowable value of each link based on the measurement results (Step S27). For example, the following processing is executed.

The distribution control planning module 111 selects a link, and refers to the values of the data transfer amount (1) T104 and the data transfer amount (2) T105 being measurement results of the selected link to calculate, as the link allowable value, a value for which the value of the data transfer amount (1) T104 is equal to or smaller than the value of the data transfer amount (2) T105 and is a maximum. The distribution control planning module 111 executes the same processing for each link. The method of calculating the allowable value is merely an example, and is not limited thereto.

The state in which the value of the data transfer amount (1) T104 is equal to or smaller than the value of the data transfer amount (2) T105 means that no stagnation of data has occurred. Therefore, the maximum value of the data transfer amount (1) T104 that causes no stagnation of data can be used as an index for evaluating processing performance of a series of processes for input, data processing, and output of the processing application 3.

The distribution control planning module 111 calculates an allocation ratio of the amounts of data of the respective links based on the link allowable values (Step S28). After that, the distribution control planning module 111 outputs the allocation ratio of the amounts of data of the respective links to the distribution control execution module 112 as the transmission plan.

In the first embodiment, the distribution control planning module 111 calculates a ratio of the reciprocals of the link allowable values of the respective links as the allocation ratio. The method of calculating the allocation ratio is merely an example, and is not limited thereto.

After the distribution control execution module 112 receives the transmission plan from the distribution control planning module 111, the distribution control execution module 112 transitions to the stable state S3 (Step S29).

The distribution control execution module 112 allocates the pieces of data received from the transmission application 2 to the respective processing applications 3 based on the transmission plan.

Figure 9:
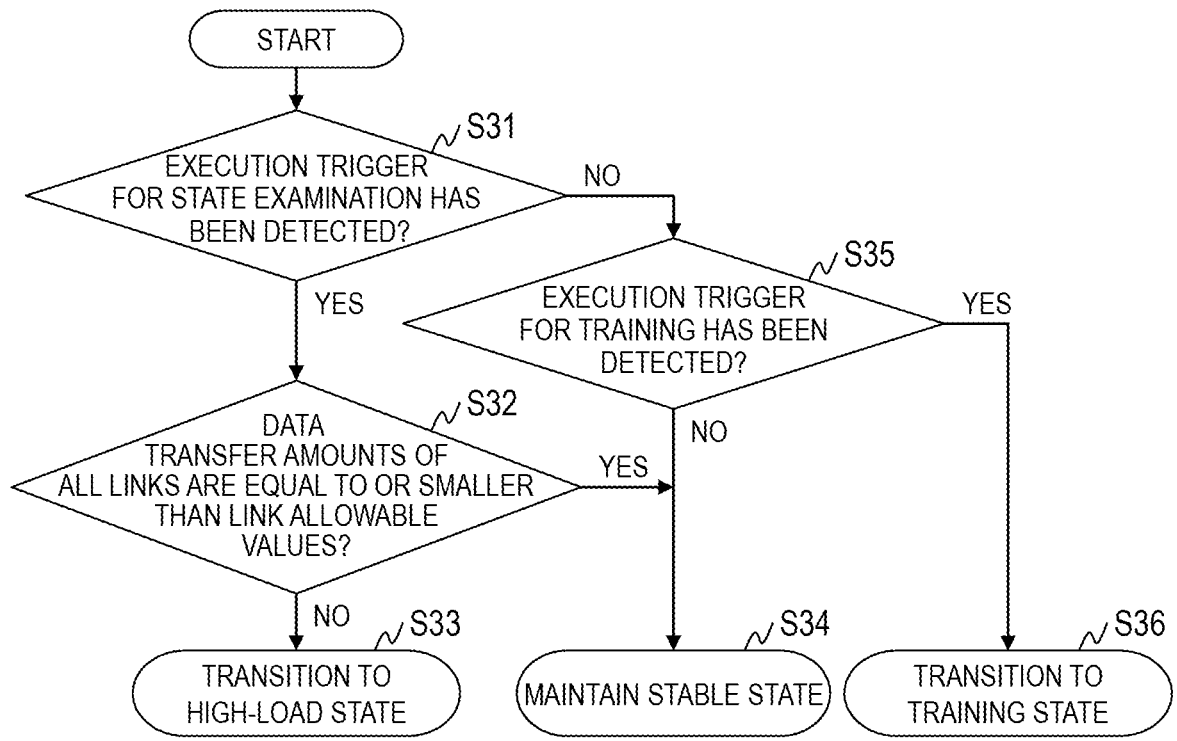
FIG. 9 is a flowchart for illustrating processing to be executed by the control system in the first embodiment under a stable state S3.

FIG. 9 is a flowchart for illustrating processing to be executed by the control system 1 in the first embodiment under the stable state S3. The control system 1 periodically executes the processing described below under the stable state S3.

The distribution control execution module 112 of the control system 1 determines whether or not the execution trigger for the state examination has been detected (Step S31). For example, the distribution control execution module 112 detects a lapse of a fixed time after the transition to the stable state S3 or after the previous processing as the execution trigger for the state examination.

In a case where the execution trigger for the state examination has been detected, the distribution control execution module 112 obtains the data transfer amounts of each link from the measurement module 121 and the measurement module 122, and determines whether or not the data transfer amounts of all the links are equal to or smaller than the link allowable values (Step S32).

In a case where the data transfer amount of at least one link is larger than the link allowable value, the distribution control execution module 112 transitions to the high-load state S4 (Step S33).

In a case where the data transfer amounts of all the links are equal to or smaller than the link allowable values, the distribution control execution module 112 maintains the stable state S3 (Step S34).

In a case where it is determined in Step S31 that the execution trigger for the state examination has not been detected, the distribution control execution module 112 determines whether or not the execution trigger for the training has been detected (Step S35). For example, the distribution control execution module 112 detects, as the execution trigger for the training, the lapse of the fixed time after the previous processing or a change in the number of replicas of an application and the coupling state of applications. The change in the number of replicas of an application and the coupling state of applications can be detected through intermediation of the measurement modules 121 and 122.

In a case where the training execution trigger has not been detected, the distribution control execution module 112 maintains the stable state S3 (Step S34).

In a case where the training execution trigger has been detected, the distribution control execution module 112 transitions to the training state S2 (Step S36).

In addition to the above-mentioned processing, the distribution control execution module 112 controls the amount of data to be transmitted to the processing application 3 in accordance with the transmission plan.

Figure 10:
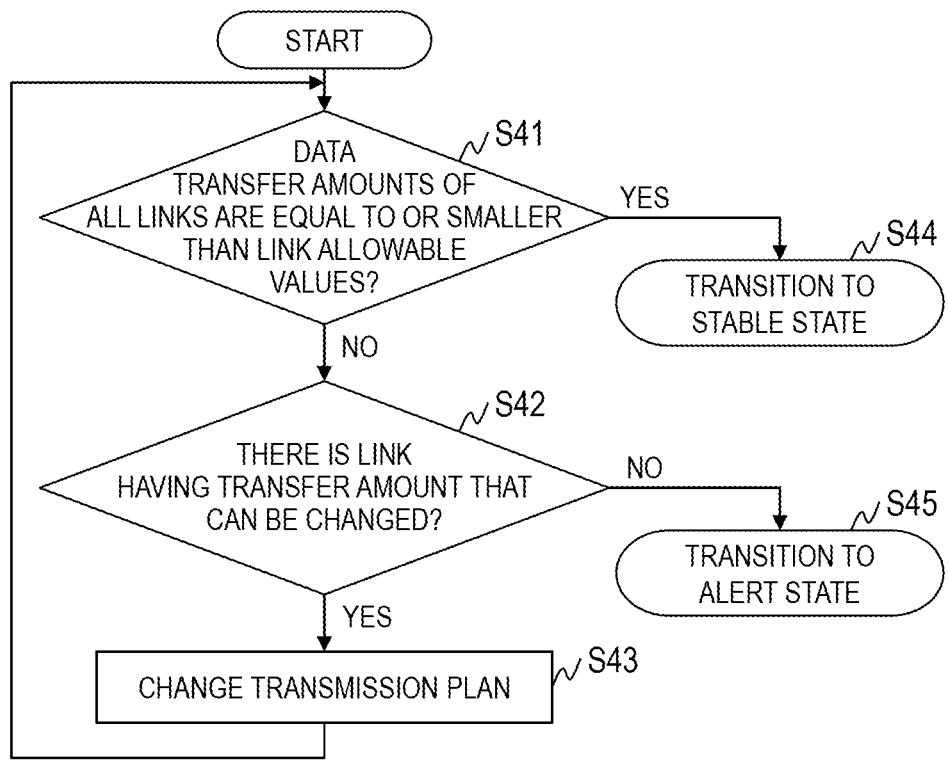
FIG. 10 is a flowchart for illustrating processing to be executed by the control system in the first embodiment under a high-load state S4.

FIG. 10 is a flowchart for illustrating processing to be executed by the control system 1 in the first embodiment under the high-load state S4.

The distribution control execution module 112 obtains the data transfer amounts of each link from the measurement modules 121 and 122, and determines whether or not the data transfer amounts of all the links are equal to or smaller than the link allowable values (Step S41).

In a case where the data transfer amounts of all the links are equal to or smaller than the link allowable values, the distribution control execution module 112 transitions to the stable state S3 (Step S44).

In a case where the data transfer amount of at least one link is larger than the link allowable value, the distribution control execution module 112 determines whether or not there is a link having the data transfer amount that can be changed (Step S42). Specifically, the distribution control execution module 112 refers to the data transfer amount of each link obtained from the measurement module 121 to determine whether or not there is a link having the amount of data smaller than the link allowable value.

In a case where there is a link having the data transfer amount that can be changed, the distribution control execution module 112 instructs the distribution control planning module 111 to change the transmission plan. In a case where the distribution control planning module 111 receives the instruction, the distribution control planning module 111 changes the transmission plan (Step S43).

Specifically, the distribution control planning module 111 changes the data transfer amounts of the link having the data transfer amount that can be changed, and calculates the allocation ratio of the amount of data of each link based on the changed data transfer amounts and current data transfer amounts of the other links. The distribution control planning module 111 outputs the calculated allocation ratio to the distribution control execution module 112 as the transmission plan. In a case where the distribution control execution module 112 receives the transmission plan, the distribution control execution module 112 controls the amount of data based on the transmission plan. The distribution control execution module 112 returns the process to Step S41 after the lapse of the fixed time.

In a case where there is no link having the data transfer amount that can be changed, the distribution control execution module 112 transitions to the alert state S5 (Step S45).

As described above, according to the first embodiment, the control system 1 evaluates processing performance of a series of processes for data input, processing, and output in the processing application 3 being a data flow type application, and controls the amount of data to be processed by each processing application 3. Thus, it is possible to prevent throughput of processing in the entire system from being bottlenecked by the processing performance of a specific processing application 3. Therefore, the throughput of processing in the entire system can be improved.

Next, an operation and control of the control system 1 are described by taking a specific example.

Figure 11:
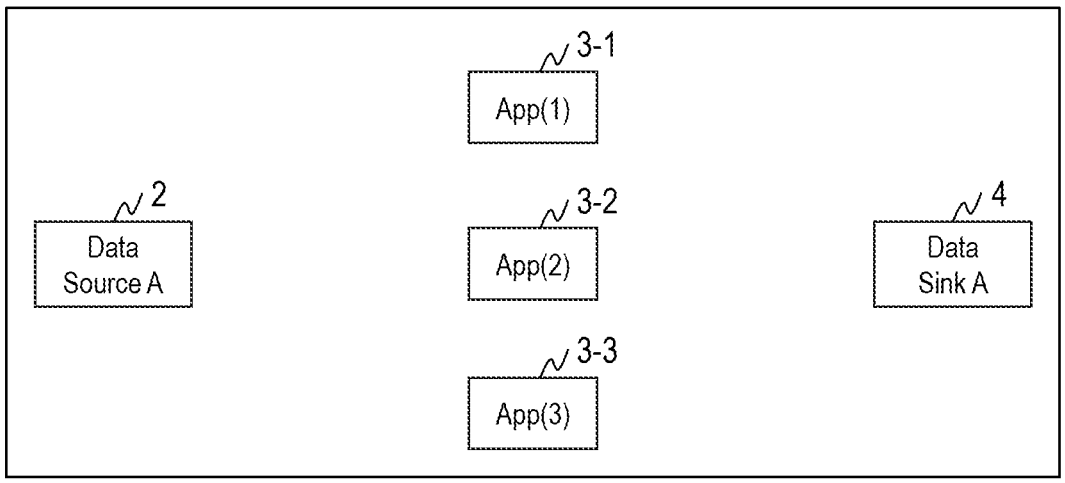
FIG. 11 is a diagram for illustrating a configuration example of applications to be controlled in the system in the first embodiment.

First, the training state S2 is described. FIG. 11 is a diagram for illustrating a configuration example of applications to be controlled in the system in the first embodiment.

Figure 12A:
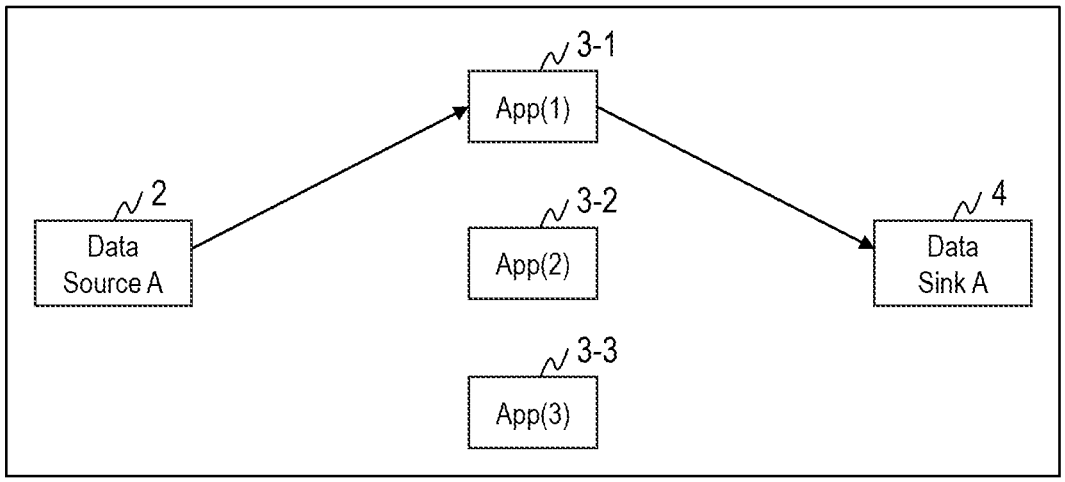
Figure 12B:
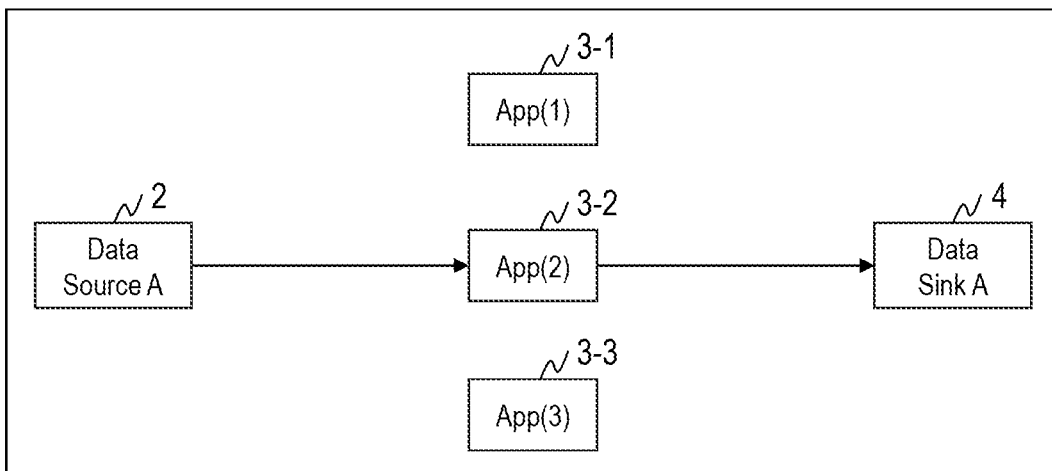

FIG. 12A, FIG. 12B, and FIG. 12C are explanatory diagrams of a method of measuring the communication indices of the control system 1 in the first embodiment. FIG. 13A, FIG. 13B, and FIG. 13C are tables for showing specific examples of the measurement result information 152 in the first embodiment. FIG. 14 is a table for showing a specific example of the link allowable value information 153 in the first embodiment.

In the following description, a service having such an application configuration as illustrated in FIG. 11 is assumed. Specifically, the service is formed of one transmission application (Data Source A) 2, a processing application (1) (App (1)) 3-1, a processing application (2) (App (2)) 3-2, a processing application (3) (App (3)) 3-3, and a reception application (Data Sink A) 4. This invention exerts the same effect even with a configuration other than such an application configuration as illustrated in FIG. 11.

In the following description, a set of the transmission application 2, the processing application (1) 3-1, and the reception application 4 is referred to as "link (1)," a set of the transmission application 2, the processing application (2) 3-2, and the reception application 4 is referred to as "link (2)," and a set of the transmission application 2, the processing application (3) 3-3, and the reception application 4 is referred to as "link (3)."

Under the training state S2, the communication indices (data transfer amounts) are measured by the following procedure. First, the distribution control execution module 112 instructs the transmission application 2 to transmit a training packet to the processing application (1) 3-1 as illustrated in FIG. 12A. The processing application (1) 3-1 transmits the training packet to the reception application 4. Training packets having different data transmission amounts are transmitted a plurality of times. The measurement modules 121 and 122 measure the data transmission amounts between the applications. As a result, such measurement results as shown in FIG. 13A are stored in the measurement result information 152.

The distribution control execution module 112 instructs the transmission application 2 to transmit a training packet to the processing application (2) 3-2 as illustrated in FIG. 12B. The processing application (2) 3-2 transmits the training packet to the reception application 4. Training packets having different data transmission amounts are transmitted a plurality of times. The measurement modules 121 and 122 measure the data transmission amounts between the applications. As a result, such measurement results as shown in FIG. 13B are stored in the measurement result information 152.

The distribution control execution module 112 instructs the transmission application 2 to transmit a training packet to the processing application (3) 3-3 as illustrated in FIG. 12C. The processing application (3) 3-3 transmits the training packet to the reception application 4. Training packets having different data transmission amounts are transmitted a plurality of times. The measurement modules 121 and 122 measure the data transmission amounts between the applications. As a result, such measurement results as shown in FIG. 13C are stored in the measurement result information 152.

In a case where such measurement results as shown in FIG. 13A to FIG. 13C are stored in the measurement result information 152, in Step S27, the distribution control planning module 111 calculates the link allowable value of the link (1) as "10 topic/second," the link allowable value of the link (2) as "20 topic/second," and the link allowable value of the link (3) as "11 topic/second." As a result, such link allowable value information 153 as shown in FIG. 14 is generated.

Next, the stable state S3 and the high-load state S4 are described. FIG. 15A and FIG. 15B are diagrams for illustrating an example of a communication state of the applications to be controlled in the first embodiment.

In a case where the execution trigger for the state examination has been detected, the distribution control execution module 112 obtains the data transfer amount of each link from the measurement module 121 and the measurement module 122.

In a case of such measurement results as shown in FIG. 15A, the data transfer amounts of the link (1), the link (2), and the link (3) are equal to or smaller than the link allowable values. Therefore, the distribution control execution module 112 maintains the stable state S3 (Step S34).

In a case of such measurement results as shown in FIG. 15B, the data transfer amount between the transmission application 2 and the processing application 3 of the link (3) is larger than the link allowable value. Therefore, the distribution control execution module 112 transitions to the high-load state S4 (Step S33). The data transmission amount between the transmission application 2 and the processing application 3 of each of the link (1) and the link (2) has reached the link allowable value, and hence there is no link having the data transfer amount that can be changed. Therefore, the distribution control execution module 112 transitions to the alert state S5 (Step S45).

Second Embodiment

In a second embodiment of this invention, a transfer time required for transmitting data from the transmission application 2 to the reception application 4 through intermediation of the processing application 3 is used as the communication index for evaluating the data transmission and reception performance of the processing application 3. The second embodiment is described below with a focus on differences from the first embodiment.

A system configuration of the second embodiment is the same as that in the first embodiment. The configuration of the control system 1 in the second embodiment is the same as that in the first embodiment.

In the second embodiment, data structure of the measurement result information 152 is partially different. FIG. 16 is a table for showing an example of the data structure of the measurement result information 152 in the second embodiment.

In the second embodiment, an entry stored in the measurement result information 152 includes the transmission application T101, the processing application T102, the reception application T103, a data transfer amount T111, and a transfer time T112. The data transfer amount T111 is the same field as the data transfer amount (1) T104. The transfer time T112 is a field for storing the transfer time required for transmitting data from the transmission application 2 to the reception application 4 through intermediation of the processing application 3.

Data structure of the link allowable value information 153 in the second embodiment is the same as that in the first embodiment. However, the transfer time is stored in the link allowable value T203.

Processing to be executed by the control system 1 in the second embodiment under the training state S2 is the same as that in the first embodiment. However, in the second embodiment, details of the processing steps of Step S25 and Step S27 are different from those of the first embodiment.

In Step S25, the distribution control execution module 112 determines that the measurement is completed in a case where the transfer time sharply increases. As a method of determining the sharp increase in the transfer time, it is conceivable to employ a method of using, for example, an average value of the transfer times, a change amount of the transfer time, and a change rate of the transfer time. The method for the determination is not limited thereto. In the second embodiment, in a case where the transfer time is changed from the previous transfer time by 10% or more, it is determined that the transfer time has sharply increased.

In Step S27, the distribution control execution module 112 calculates, as the link allowable value, the transfer time at a time point at which the transfer time sharply increases by the second largest amount. The link allowable value may be calculated by another method. The transfer time can be used as an index for evaluating the processing performance of a series of processes for input, data processing, and output of the processing application 3.

Processing to be executed by the control system 1 in the second embodiment under the stable state S3 and the high-load state S4 is the same as that in the first embodiment.

Next, an operation and control of the control system 1 are described by taking a specific example.

First, the training state S2 is described. It is assumed that a configuration of the applications to be controlled by the system is the configuration illustrated in FIG. 11. FIG. 17A, FIG. 17B, and FIG. 17C are tables for showing specific examples of the measurement result information 152 in the second embodiment. FIG. 18 is a table for showing a specific example of the link allowable value information 153 in the second embodiment.

Under the training state S2, the communication indices (transfer times) are measured by the following procedure. First, the distribution control execution module 112 instructs the transmission application 2 to transmit a training packet to the processing application (1) 3-1 as illustrated in FIG. 12A. The processing application (1) 3-1 transmits the training packet to the reception application 4. Training packets having different data transmission amounts are transmitted a plurality of times. The measurement modules 121 and 122 measure the transfer time of the data. As a result, such measurement results as shown in FIG. 17A are stored in the measurement result information 152.

The distribution control execution module 112 instructs the transmission application 2 to transmit a training packet to the processing application (2) 3-2 as illustrated in FIG. 12B. The processing application (2) 3-2 transmits the training packet to the reception application 4. Training packets having different data transmission amounts are transmitted a plurality of times. The measurement modules 121 and 122 measure the transfer time of the data. As a result, such measurement results as shown in FIG. 17B are stored in the measurement result information 152.

The distribution control execution module 112 instructs the transmission application 2 to transmit a training packet to the processing application (3) 3-3 as illustrated in FIG. 12C. The processing application (3) 3-3 transmits the training packet to the reception application 4. Training packets having different data transmission amounts are transmitted a plurality of times. The measurement modules 121 and 122 measure the transfer time of the data. As a result, such measurement results as shown in FIG. 17C are stored in the measurement result information 152.

In a case where such measurement results as shown in FIG. 17A to FIG. 17C are stored in the measurement result information 152, in Step S27, the distribution control planning module 111 calculates the link allowable value of the link (1) as "0.93 second," the link allowable value of the link (2) as "0.67 second," and the link allowable value of the link (3) as "1.01 seconds." As a result, such link allowable value information 153 as shown in FIG. 18 is generated.

Figure 19A:
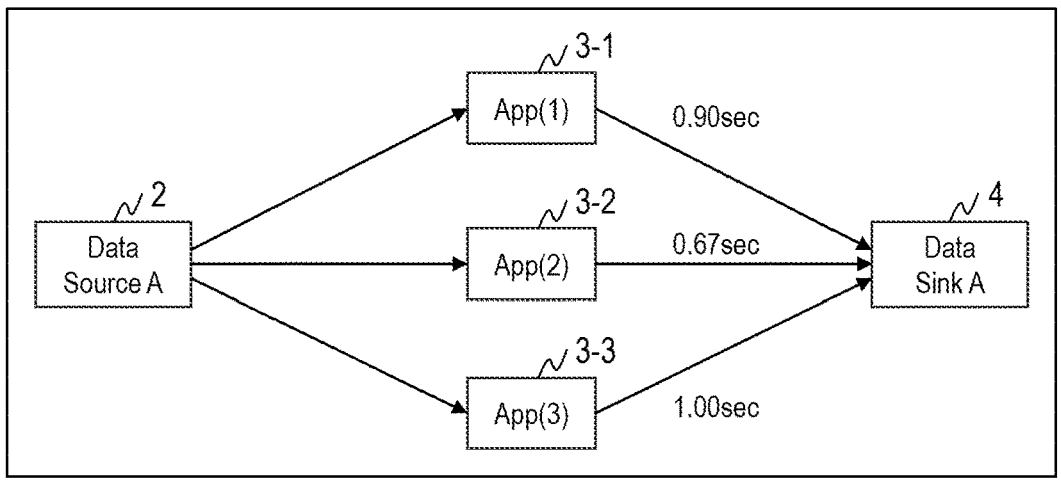
FIG. 19A, FIG. 19B, and FIG. 19C are diagrams for illustrating an example of a communication state of the applications to be controlled in the second embodiment.
Figure 19B:
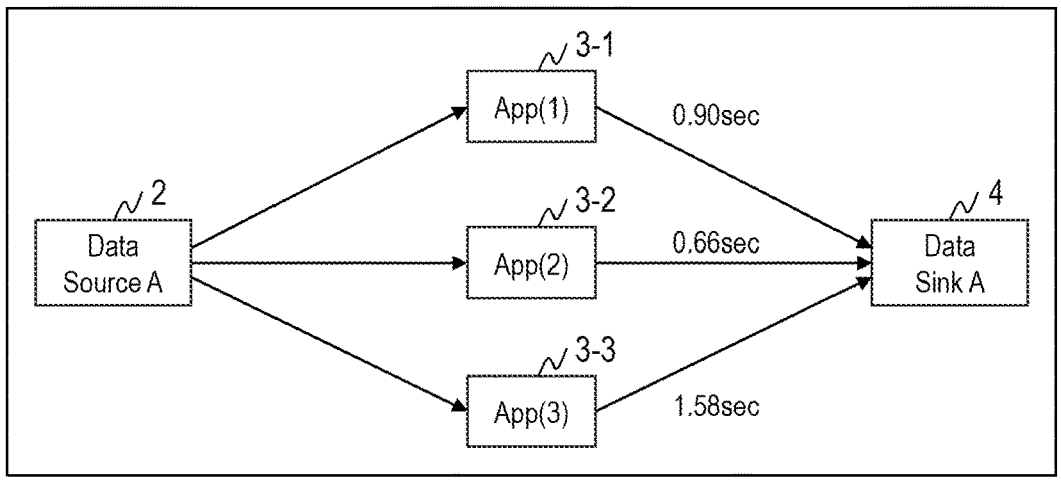
Figure 19C:
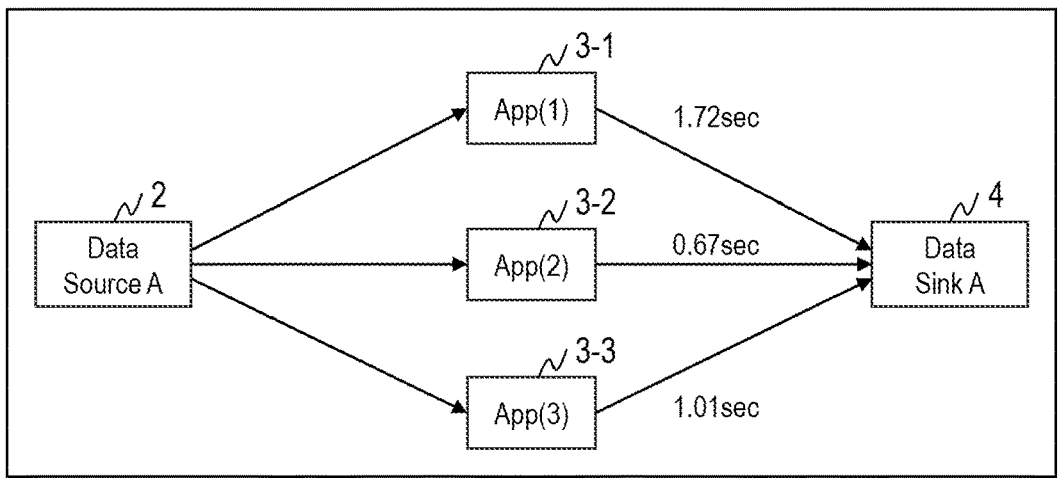
Figure 20:
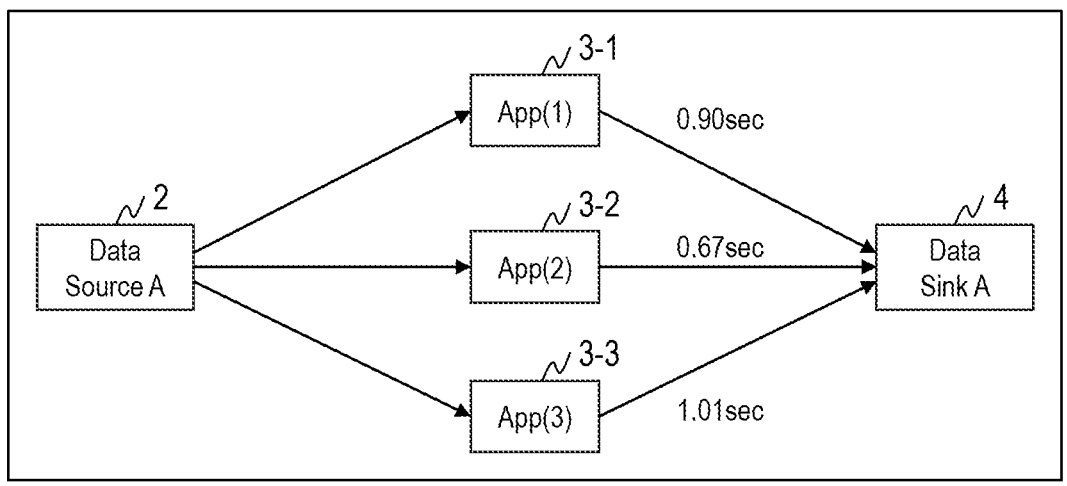
FIG. 20 is a diagram for illustrating an example of a communication state of the applications to be controlled in the second embodiment.

Next, the stable state S3 and the high-load state S4 are described. FIG. 19A, FIG. 19B, and FIG. 19C are diagrams for illustrating an example of a communication state of the applications to be controlled in the second embodiment. FIG. 20 is a diagram for illustrating an example of a communication state of the applications to be controlled in the second embodiment.

In a case where the execution trigger for the state examination has been detected, the distribution control execution module 112 obtains the data transfer amount of each link from the measurement module 121 and the measurement module 122.

In a case of such measurement results as shown in FIG. 19A, the transfer times of the link (1), the link (2), and the link (3) are equal to or smaller than the link allowable values. Therefore, the distribution control execution module 112 maintains the stable state S3 (Step S34).

In a case of such measurement results as shown in FIG. 19B, the transfer time of the link (3) is larger than the link allowable value. Therefore, the distribution control execution module 112 transitions to the high-load state S4 (Step S33). The transfer times of the link (1) and the link (2) are equal to or smaller than the link allowable values, and hence there is a link having the data transfer amount that can be changed. Therefore, the distribution control execution module 112 changes the transmission plan (Step S43).

For example, the distribution control planning module 111 changes the transmission plan so that a part of the data of the link (3) is to be transmitted to at least any one of the link (1) or the link (2).

In a case where such a communication state as illustrated in FIG. 20 is reached as a result of changing the transmission plan, the distribution control execution module 112 transitions to the stable state S3 (Step S44).

In a case of such measurement results as shown in FIG. 19C, the transfer time of the link (1) is larger than the link allowable value. Therefore, the distribution control execution module 112 transitions to the high-load state S4 (Step S33). The transfer times of the link (2) and the link (3) have reached the link allowable values, and hence there is no link having the data transfer amount that can be changed. Therefore, the distribution control execution module 112 transitions to the alert state S5 (Step S45).

What is claimed is:

1. A computer system, comprising at least one computer including a processor, a storage device coupled to the processor, and a network interface coupled to the processor, the processor being configured to:
   obtain, from each of a plurality of processing applications, a communication index for evaluating data transmission and reception performance of the each of the plurality of processing applications, the plurality of processing applications each being configured to:
   obtain data from a source object; execute predetermined processing on the data; and transmit a result of the processing to a destination object;
   calculate a link allowable value indicating processing performance of each of the plurality of processing applications based on the communication index;
   generate a transmission plan relating to an amount of data to be allocated to each of the plurality of processing applications based on the link allowable value; and
   control transmission of the data to each of the plurality of processing applications based on the transmission plan;
   wherein the processor is configured to:
   calculate a ratio of amounts of data to be transmitted to the respective plurality of processing applications through use of the link allowable values of the respective plurality of processing applications;
   generate the transmission plan including the ratio of the amounts of data to be transmitted to the respective plurality of processing applications; and
   wherein the processor is configured to:
   transmit test data having a different amount of data a plurality of times for each of the plurality of processing applications, to thereby obtain, as the communication indices, first data transfer amounts between a source object and a processing application and second data transfer amounts between a processing application and a destination object; and
   calculate, as the link allowable value, the first data transfer amount being equal to or smaller than the second data transfer amount and being a maximum.

2. The computer system according to claim 1, wherein the processor is configured to:
   transmit test data having a different amount of data a plurality of times for each of the plurality of processing applications, to thereby obtain, as the communication indices, transfer times required for a processing application to receive data from a source object and transmit the data to a destination object; and
   calculate, as the link allowable value, the transfer time having a change amount between a lower change amount and a upper change amount and being longest.

3. The computer system according to claim 1, wherein the processor is configured to change the transmission plan based on the link allowable values of the plurality of processing applications other than a target processing application having the communication index larger than the link allowable value, in a case where the target processing application is detected during the control of the transmission of the data to the plurality of processing applications which uses the transmission plan.

4. The computer system according to claim 1, wherein the processor is configured to:
   monitor a trigger for regenerating the transmission plan during the control of the transmission of the data to the plurality of processing applications which uses the transmission plan; and
   regenerate the transmission plan in a case where the trigger for regenerating the transmission plan is detected.

5. The computer system according to claim 1, wherein the processor is configured to provide an interface for receiving designation of the communication index to be obtained and an interface for displaying a status of the control of the transmission of the data to the plurality of processing applications which uses the transmission plan.

6. A data transmission control method to be executed by a computer system,
   the computer system having at least one computer including a processor, a storage device coupled to the processor, and a network interface coupled to the processor, the data transmission control method including:

a first step of obtaining, by the processor, from each of a plurality of processing applications, a communication index for evaluating data transmission and reception performance of the each of the plurality of processing applications, the plurality of processing applications each being configured to: obtain data from a source object execute predetermined processing on the data; and transmit a result of the processing to a destination object;

a second step of calculating, by the processor, a link allowable value indicating processing performance of each of the plurality of processing applications based on the communication index;

a third step of generating, by the processor, a transmission plan relating to an amount of data to be allocated to each of the plurality of processing applications based on the link allowable value; and a fourth step of controlling, by the processor, transmission of the data to each of the plurality of processing applications based on the transmission plan; and wherein the third step includes the steps of:

calculating, by the processor, a ratio of amounts of data to be transmitted to the respective plurality of processing applications through use of the link allowable values of the respective plurality of processing applications; and generating, by the processor, the transmission plan including the ratio of the amounts of data to be transmitted to the respective plurality of processing applications;

wherein the first step includes a step of transmitting, by the processor, test data having a different amount of data a plurality of times for each of the plurality of processing applications, to thereby obtain, as the communication indices, first data transfer amounts between a source object and a processing application and second data transfer amounts between a processing application and a destination object; and wherein the second step includes a step of calculating, by the processor, as the link allowable value, the first data transfer amount being equal to or smaller than the second data transfer amount and being a maximum.

7. The data transmission control method according to claim 6, wherein the first step includes a step of transmitting, by the processor, test data having a different amount of data a plurality of times for each of the plurality of processing applications, to thereby obtain, as the communication indices, transfer times required for a processing application to receive data from a source object and transmit the data to a destination object; and wherein the second step includes a step of calculating, by the processor, as the link allowable value, the transfer time having a change amount between a lower change amount and an upper change amount and being longest.

8. The data transmission control method according to claim 6, further including a step of changing, by the processor, the transmission plan based on the link allowable values of the plurality of processing applications other than a target processing application having the communication index larger than the link allowable value, in a case where the target processing application is detected during the control of the transmission of the data to the plurality of processing applications which uses the transmission plan.

9. The data transmission control method according to claim 6, further including the steps of:

monitoring, by the processor, a trigger for regenerating the transmission plan during the control of the transmission of the data to the plurality of processing applications which uses the transmission plan; and regenerating, by the processor, the transmission plan in a case where the trigger for again generating the transmission plan is detected.

10. The data transmission control method according to claim 6, further including the steps of:

providing, by the processor, an interface for receiving designation of the communication index to be obtained; and providing, by the processor, an interface for displaying a status of the control of the transmission of the data to the plurality of processing applications which uses the transmission plan.

* * * * *